United States Patent [19]

Kakade

[11] Patent Number: 4,614,653
[45] Date of Patent: Sep. 30, 1986

[54] MILK REPLACER AND METHOD OF FEEDING

[75] Inventor: Madhu Kakade, Falcon Heights, Minn.

[73] Assignee: Cargill, Incorporated, Minneapolis, Minn.

[21] Appl. No.: 730,319

[22] Filed: May 2, 1985

Related U.S. Application Data

[63] Continuation-in-part of Ser. No. 516,454, Jul. 26, 1983, abandoned.

[51] Int. Cl.$^4$ ............................................. A23K 1/08
[52] U.S. Cl. ................................... 426/2; 426/56; 426/72; 426/74; 426/583; 426/807
[58] Field of Search ............... 426/2, 56, 72, 74, 656, 426/807, 580, 583

[56] References Cited

U.S. PATENT DOCUMENTS

| | | | |
|---|---|---|---|
| 3,560,220 | 2/1971 | Bangert | 426/583 |
| 3,649,291 | 3/1972 | Elten | 426/584 X |
| 3,798,339 | 3/1974 | Peng | 426/583 X |
| 4,054,677 | 10/1977 | Orban | 426/656 X |
| 4,132,808 | 1/1979 | Kakade | 426/2 |

FOREIGN PATENT DOCUMENTS 129643 11/1982 Japan.

*Primary Examiner*—R. B. Penland
*Attorney, Agent, or Firm*—Fitch, Even, Tabin & Flannery

[57] ABSTRACT

An improved flowable milk replacer concentrate having good shelf stability and ready reconstitutability is provided for the feeding of monograstic animals, which concentrate can be readily reconstituted to provide a milk replacer. The milk replacer concentrate has 50 to 75 percent total solids and comprises 10 to 45 percent sugars, including 10 to 35 percent lactose plus up to 35 percent monosaccharides or disaccharides or mixture thereof, 10 percent to 16 percent protein, including at least 60 percent non-heat denatured milk serum proteins; and 1 to 25 percent fat. The ingredients are mixed together and emulsified, as by homogenization, to provide a shelf-stable, flowable product. The milk replacer concentrate has a viscosity of between 100 and 5000 centipoises and a pH of between 4.0 and 7.0 with a water activity of between 7.0 and 0.87. The milk replacer concentrate readily mixes with water to provide a milk replacer having a solids content of about that of cows' milk.

13 Claims, No Drawings

MILK REPLACER AND METHOD OF FEEDING

This is a continuation-in-part of U.S. application Ser. No. 516,454 filed July 26, 1983, now abandoned.

The present invention relates generally to a milk replacer for feeding monogastric animals, particularly young animals, and its method of making and feeding, and more particularly relates to an improved, shelf-stable, flowable milk replacer concentrate and its method of making and feeding to monogastric animals.

BACKGROUND OF INVENTION

Animals having monogastric digestion are frequently fed milk or a milk substitute during their early life. Various milk substitutes have been available in dry form, which condition was previously necessary for storage purposes. This dry form of milk substitute is difficult to mix up and dilute on the farm. Heretofore, there was not available a shelf-stable milk replacer concentrate which could be readily diluted for feeding.

Concentrated milks are known, and one form of such milks is sweetened, condensed milk. However, this product does not provide the necessary growth factors for young animals and is particularly lacking in the desired protein for such animals.

Further, Japanese Pat. No. 82,129,643 discloses a milk substitute for domestic animals which is formulated from proteins and protein hydrolysates, oils and fats, and polyhydroxy compounds, such as propylene glycol, glycol, sugar alcohols, and monosaccharides. However, this milk substitute also does not provide sufficient growth factors for young animals.

It is desired to provide a flowable milk replacer concentrate which is shelf-stable and which provides desired growth factors for monogastric animals. It is also desired to provide such a concentrate which does not separate and which can be readily diluted and conveniently handled for feeding to monogastric animals.

Accordingly, it is a principal object of this invention to produce an improved shelf-stable, homogenous, flowable milk substitute or replacer concentrate for monogastric animals, particularly young monogastric animals. A further object of this invention is the provision of such a milk replacer concentrate which can be readily diluted to about the solids content of cows' milk for the feeding of monogastric animals. A still further object of the invention is the provision of a milk replacer which can provide preferred growth factors for young monogastric animals.

SUMMARY OF THE INVENTION

The invention provides an improved, shelf-stable, flowable liquid milk replacer concentrate of non-heat denatured milk whey protein, sugar, and fat or oil. The concentrate for monogastric animals comprises about 10 to about 45 percent sugars, including about 10 percent to about 35 percent lactose or its monosaccharide hydrolysis products, plus up to about 35 percent additional monosaccharides or disaccharides or mixture thereof, about 10 percent to about 16 percent proteins, of which at least about 60 percent are non-heat denatured milk serum proteins, about 1 percent to about 25 percent fat or oil, and an emulsifier in an amount sufficient to emulsify the fat or oil in the concentrate. The fat or oil is emulsified in the concentrate. The milk replacer concentrate has a total solids content of from about 50 percent to about 75 percent, a viscosity of between about 100 and about 5000 centipoises (CPS), a pH between about 4.0 and about 7.0 and a water activity of between about 0.7 and about 0.87. The concentrate provides a complete nutrient source for monogastric animals, whereby it may be fed to animals subsequent to dilution with water to an appropriate consistency.

DETAILED DESCRIPTION OF CERTAIN PREFERRED EMBODIMENTS

The present invention provides an improved milk replacer or substitute in concentrate form which is highly nutritious and which is shelf-stable at ambient temperatures. The milk replacer concentrate can be conveniently handled and readily diluted and is preferably diluted to about the solids content of cows' milk. The concentrate can be fortified with minerals, vitamins, and medicants to provide desired formulations for animals, particularly young animals. It is most important that the product be microbiologically stable and shelf-stable and that it can be readily diluted to a desired solids content.

The milk replacer concentrate of the invention comprises from about 50 to about 75 percent solids, and therefore 25 to 50 percent moisture. (All percentages herein are by weight, unless otherwise indicated.) The total sugars in the concentrate comprise 10 to 45 percent of the concentrate with from 10 to 35 percent of the concentrate being lactose, which may or may not be hydrolyzed, as with lactase enzyme. Additional monosaccharide and/or disaccharide sugars, such as fructose, may be added up to a level of 35 percent. The level of lactose, a disaccharide (or its monosaccharide hydrolysis products), is at least about as great as the level of additional monosaccharides and/or disaccharides.

Milk whey (serum) protein is an important ingredient of the milk replacer concentrate of the invention. Protein, at least 60% of which is milk whey protein, constitutes between about 10 percent and about 16 percent of the concentrate, as determined by the Kjeldahl procedure so that the nitrogen will analyze at between about 1.68 percent and 2.6 percent with the protein level being determined by multiplying by 6.25. It is important that the milk whey protein not be heat-denatured when incorporated into the concentrate and when the concentrate is prepared. Accordingly, the protein should not be subjected to time-temperature conditions which significantly denature proteins. It is also important that the proteins in the concentrate comprise at least 60 percent milk serum proteins which include lactalbumin and lactoglobulin. The character of the protein is especially important for young monogastric animals to provide the necessary growth factors. The protein in the concentrate may be hydrolyzed to provide a predigested protein source for ease of further digestion and absorption in the gastrointestinal tract, particularly for feeding young animals. This can be accomplished in a known manner by the use of protease.

For providing the necessary energy to the animal, the concentrate includes from about 1 to about 25 percent fat or oil, preferably in the liquid form, and derived from soya beans, sunflower seed, cotton seed, or other sources. A suitable and relatively inexpensive fat is choice white grease. A small amount of an emulsifier is desirably present to facilitate emulsification of the fat or oil and to promote the stability of the concentrate. A fatty emulsifier such as mono-and/or diglycerides is most satisfactory.

The sugars and fats or oils each contribute to the caloric value of the milk substitute, providing energy to the animal. Generally, the fats and sugars should cumulatively provide the milk replacer concentrate with between about 500 and about 5,000 calories per liter, sufficient to provide the milk replacer at about 11% solids, with between about 100 and about 1,000 calories per liter. Generally fats will provide more calories than an equivalent amount of sugar, and the caloric value of the milk replacer will depend upon the species and age of the animal. In addition, the fats and sugars contribute to the solids content of the concentrate, which should be at least about 50%, thereby providing a sufficiently low water activity, e.g., below 0.87, to prevent microbial growth. Generally, sugars are more effective than fats or oils in reducing the water activity. Thus for formulations having solid levels at the lower end of the permissable amount, e.g., approaching 50%, the sugar content relative to the fat content may be high, whereas for formulations having high solids content, e.g., approaching 75%, the relative proportions of fats may be higher. The relative proportions of fat and sugar may also be adjusted depending on the relative costs of the raw materials.

Although the milk replacer is primarily intended as a food source for young monograstric animals, it is intended to feed animals of any age. One instance of use of such formulations for mature animals is lactating females, particularly if their milk output is low. Formulations for lactating females are preferably high in fat content.

The milk replacer of the invention may also include a standard mineral formulation and vitamins. Potassium chloride and calcium phosphate may be added, as well as sodium chloride, although these additions are not necessary to the formulation. A medicant may be included in the concentrate, if desired. In addition, some flavor may be present in the concentrate, such as a milk aroma.

In order to provide maximum microbiological stability, the concentrate may include a sorbate and/or sodium bisulfite.

The physical characteristics of the milk replacer concentrate of the invention are quite important and, as indicated, the milk replacer concentrate should be homogeneous and have a viscosity of between 100 and 5000 centipoises. The pH of the concentrate should be in the range of 4.0 to 7.0. An important characteristic of the milk replacer concentrate is its water activity (AW) which should be between about 0.70 and about 0.87. The water activity referred to herein is determined by a Beckman Hygroline Recorder, Model VFB, and is measured at 25° C. with the recorder being calibrated against saturated salt solutions. At water activities in excess of 0.87, the concentrate lacks shelf stability as it is subject to microbial growth and does not provide the desired product.

As indicated above, the milk replacer concentrate is diluted to a solids content approximating that of cows' milk, and specifically to a solids content of about 11 percent. In this form, the diluted milk replacer concentrate is fed to young animals and provides highly desired growth factors. No other additives or nutrients are necessary because all growth factors are included in the initial formulation of the milk replacer concentrate. Of course, at the time of dilution, various additives can be provided to the diluted milk replacer concentrate as desired, if they are not included in the initial formulation of the milk replacer concentrate.

The milk replacer concentrate is manufactured by mixing the ingredients to achieve the desired solids level and then emulsifying the ingredients under high shear in a homogenizer or colloid mill, such as a Gaulin homogenizer, Gaulin colloid mill or hand homogenizer, with pressures of between about 2,000 psig and 7,000 psig normally being used to obtain the emulsification.

In order to facilitate manufacture of the milk replacer concentrate, the protein is provided by a whey protein concentrate which is available on the market and which may be prepared at various protein concentrations. The whey protein concentrates (WPC) may have the following approximate analyses at the indicated total solids levels:

| % Total Solids | % Protein d.b. | % Lactose d.b. | % Ash d.b. | % Fat d.b. |
|---|---|---|---|---|
| 39.5 | 55 | 38 | 6 | 1 |
| 55 | 35 | 56 | 8 | 1 |
| 62.0 | 25 | 65 | 9 | 1 |

The whey protein is selected such that more than 60 percent of the protein constitutes milk serum proteins. The remaining proteins are casein or some other digestible proteins. The whey protein concentrate may be hydrolyzed to convert the lactose present to glucose and galactose. This can be accomplished in a known manner by the use of lactase. As before indicated, the protein in the WPC may also be hydrolyzed in a known manner by the use of protease.

The source of sugars can be corn syrup, which provides dextrose, also known as glucose, or which can provide fructose for the formulation. It is preferred to use high fructose corn syrups (HFCS). The oil, of course, can be derived from various sources. As before pointed out, various known emulsifiers can be utilized to promote homogenization and incorporation of the fat into the milk replacer concentrate to provide a more stable product and known antimycotics can be added to enhance microbiological stability.

EXAMPLE 1

A milk replacer concentrate for the feeding of young monogastric animals was prepared by adding into a mixing tank 71.43 percent of a hydrolyzed whey protein concentrate, the hydrolysis being effected by treatment with lactase. The whey protein concentrate comprised 56.6 percent solids and included 35 percent protein on a dry basis. The protein included more than 60 percent serum proteins. Dicalcium phosphate was added to a level of 2 percent and a commercially available mixture of vitamins, minerals and antibiotics was added to a level of 0.5 percent. Potassium sorbate, as an antimycotic, was added at a level of 0.1 percent. Next, high fructose corn syrup (HFCS) comprising 83 percent solids was added at a level of 19.17 percent. Soybean oil was then added at a level of 6.6 percent and included a fatty emulsifier, sold under the tradename DUREM 114, in an amount of 0.1 percent of the total mixture. Finally, sodium bisulfite at a level of 0.3 percent and commercially available milk aroma was added at a level of 0.1 percent.

The resulting mixture had a total solids content of 65 percent, leaving a moisture level of 35 percent. Protein was present at a level of 14 percent.

The ingredients were thoroughly mixed together and then homogenized through a Gaulin two-stage homogenizer at a pressure of 5,000 psig at the second stage, which effected emulsification by homogenization of the ingredients and provided a flowable product having a viscosity after 16 hours of 2,700 centipoises. The pH was 5.7 and the water activity (AW) was 0.852.

The milk replacer concentrate had a high shelf stability and exhibited substantial resistance to mold, yeast, and fungi.

The product was introduced into a pail and readily mixed with five parts of water to provide a milk replacer having 11 percent solids. The milk replacer was fed to young animals and exhibited equivalent results to commercially available reconstituted dry milk replacer.

EXAMPLE 2

The following ingredients were mixed together at the following percentages:

| | |
|---|---|
| Whey protein concentrate | 46.6 |
| Total solids 42.9% | |
| Protein (d.b.) 75% | |
| Sodium chloride | 4.0 |
| High D.E. corn syrup (62 D.E.) | 42.3 |
| Total solids 81% | |
| Sunflower oil | 7.0 |
| Emulsifier | .1 |
| Total Solids | 65 |
| Protein by analysis | 15 |

The ingredients were thoroughly mixed and emulsified in a hand operated homogenizer. The product was homogeneous and flowable, having a viscosity of 1,250 centipoises after 16 hours. The pH was 5.9 and the water activity was 0.86. The product had good shelf stability and was readily diluted with five parts of water to provide a milk replacer for feeding to young animals.

EXAMPLE 3

The following ingredients were mixed at the indicated percentages:

| | |
|---|---|
| Whey protein concentrate | 55.5 |
| Total solids 39.5% | |
| Protein (d.b.) 55% | |
| Sodium chloride | 4.0 |
| Potassium chloride | 1.4 |
| Dicalcium phosphate | 2.0 |
| Vitamins, minerals, antibiotics | .4 |
| Potassium sorbate | .1 |
| HFCS | 31.0 |
| Total solids 83% | |
| Soybean oil | 5.5 |
| Emulsifier | .1 |
| Protein by analysis | 11.7 |

The mixture was homogenized in a Gaulin colloid mill at a pressure of 2000 psig and provided a milk replacer concentrate having total solids of 60.5 percent and a protein level, as analyzed, of 11.7 percent. The viscosity was 3360 centipoises after 16 hours and the pH was 6.0. The water activity was 0.835. The product readily mixed with five parts of water to provide a milk replacer for feeding young animals.

EXAMPLE 4

The following ingredients were mixed together at the indicated percentages:

| | |
|---|---|
| Whey protein concentrate | 63.07 |
| Total solids 53% | |
| Protein (d.b.) 35% | |
| Dicalcium phosphate | 2.0 |
| Vitamins, minerals, antibiotics | .4 |
| Potassium sorbate | .1 |
| HFCS | 28.73 |
| Total solids 83% | |
| Soybean oil | 5.5 |
| Emulsifier | .1 |

The resulting mixture was homogenized to provide a flowable milk replacer concentrate. The concentrate had 65 percent solids and analyzed 11.7 percent protein. The concentrate had a viscosity, after 16 hours, of 810 centipoises and a pH of 6.25. The water activity was 0.864. The product readily mixed with five parts of water to provide a milk replacer for feeding to young animals.

EXAMPLE 5

The following ingredients were blended together at the indicated levels:

| | |
|---|---|
| Whey protein concentrate | 90.6 |
| (lactase treated) | |
| Total solids 62.0% | |
| Protein (d.b.) 25% | |
| Dicalcium phosphate | 2.0 |
| Vitamins, minerals, antibiotics | .5 |
| Potassium sorbate | .1 |
| Soybean oil | 6.6 |
| Emulsifier | .1 |
| Sodium bisulfite | .3 |
| Milk aroma | .1 |

The resulting mixture was homogenized by means of a hand homogenizer to provide a flowable milk replacer concentrate. The concentrate had 65 percent solids and analyzed 14.4 percent protein. The concentrate had a viscosity, after 16 hours, of 4070 centipoises and a pH of 6.15. The water activity was 0.85. The product readily mixed with five parts of water to provide a milk replacer for feeding to young animals.

EXAMPLE 6

The following ingredients were blended together at the indicated percentages:

| | |
|---|---|
| Whey protein concentrate | 69.0 |
| Total solids 59.7% | |
| Protein (d.b.) 35% | |
| Dicalcium phosphate | .9 |
| Vitamins, minerals, antibiotics | .4 |
| Potassium sorbate | .1 |
| HFCS | 22.9 |
| Total solids 83% | |
| Soybean oil | 6.6 |
| Emulsifier | .1 |

The resulting mixture had a total solids of 68 percent and analyzed protein level of 14.4 percent. The flowable concentrate had a viscosity of 2050 after 16 hours and a pH of 6.1. The water activity was 0.859. The concentrate readily mixed with five parts of water to provide a milk replacer for feeding to young animals.

EXAMPLE 7

The following ingredients were blended together at the indicated level:

| | |
|---|---|
| Whey protein concentrate<br>Total solids 59.7%<br>Protein (d.b.) 35% | 69.0 |
| Dicalcium phosphate | .9 |
| Vitamins, minerals, antibiotics | .4 |
| Potassium sorbate | .1 |
| HFCS<br>Total solids 83% | 22.9 |
| Soybean oil | 6.6 |
| Emulsifier | .1 |

The mixture was homogenized in a hand operated homogenizer and had a total solids of 68 percent with the protein analyzing 14.0 percent. The concentrate had a viscosity of 1600 centipoises after 16 hours and a pH of 6.0. The water activity was 0.837. The flowable concentrate readily mixed with five parts of water to provide a milk replacer for feeding to young animals.

EXAMPLE 8

The following ingredients were blended together at the indicated percentages:

| | |
|---|---|
| Whey protein concentrate<br>(protease treated)<br>Total solids 56.6%<br>Protein (d.b.) 35% | 71.43 |
| Dicalcium phosphate | 2.0 |
| Vitamins, minerals, antibiotics | .5 |
| Potassium sorbate | .1 |
| HFCS<br>Total solids 83% | 19.17 |
| Soybean oil | 6.6 |
| Emulsifier | 1.1 |
| Milk aroma | 1.1 |
| Protein by analysis | 14.4 |

The mixture had a total solids content of 65.6 percent and analyzed 14.4 percent protein. The concentrate had a viscosity of 414 centipoises after 16 hours and a pH of 4.0. The concentrate readily mixed with five parts of water to provide a milk replacer for feeding to young animals.

EXAMPLE 9

A concentrate (A) was formulated as follows:

| CONCENTRATE A | | | |
|---|---|---|---|
| Ingredient | % in Formula | % Solids | % Protein |
| 36.5% protein WPC, 41.5% solids | 72.62 | 30.13 | 11.0 |
| Trace mineral solution | 0.16 | 0.043 | — |
| Magnesium sulfate heptahydrate | 0.112 | 0.575 | — |
| BASF water dispersible vitamins | 0.538 | 0.538 | — |
| Calcium carbonate | 0.40 | 0.40 | — |
| Propionic acid | 0.40 | 0.40 | — |
| Salt (NaCl) | 1.23 | 1.23 | — |
| Glucose 95 DE 80.5% solids | 19.4915 | 15.5932 | — |
| Choice white grease | 4.5 | 4.5 | |
| Fat soluble vitamins | 0.028 | 0.028 | |
| Lecithin | 0.10 | 0.10 | |
| Tenox 2 | 0.0055 | 0.0055 | |
| Product 198 | 0.015 | 0.007 | |
| 75% H$_3$PO$_4$ to attain pH 5.0 | 0.4 | 0.146 | |
| Sorbic acid | 0.1 | 0.1 | |
| | | 53.29% Total Solids | |

The commercial whey protein concentrate having approximately 40% solids was hydrolyzed with 0.3% protease at pH 6.5 and 20° C. for 16 hours. After mixing the ingredients, the sample was heat exchanged at 155° F. for 30 seconds prior to hand homogenization. The viscosity of concentrate A was 1425 CPS.

EXAMPLE 10

Concentrates B, C, and D were formulated and prepared identical to concentrate A in Example 9, except that the fat content was increased to 12.75%, 15.5% and 18.25%, respectively, with corresponding reductions in the sugar solids content, thereby maintaining an identical 53.29% total solids. The viscosity of these concentrates B, C, and D were 2780, 3500 and 2940, respectively.

EXAMPLE 11

Concentrates E, F, and G were formulated as concentrate A except as a total glucose syrup replacement, the following fat formulations were substituted in amounts to maintain an identical total solids content:
  E. substitute (for the glucose syrup) choice white grease, Tenox 2, lecithin, and Product 198 (to improve odor);
  F. substitute 50% choice white grease and 50% soybean oil along with Tenox 2, lecithin, and Product 198;
  G. substitute choice white grease, Tenox 2, lecithin, and Product 198 (to improve odor) for the glucose syrup plus 0.5% titanium.

The viscosities of formulations E, F, and G were 2390, 2270 and 2840, respectively.

EXAMPLE 12

Concentrate A was mofified by the addition of a dry 55% WPC to contain additional amounts of hydrolyzed protein. Concentrate H, I, and J contained 13.75%, 16.5% and 19.25% hydrolyzed protein, respectively. Their viscosities after 3 days were 2025, 4000 and 10,500 CPS, respectively. The failure of formula J to provide a viscosity of 5000 CPS or less, indicates that there is a limit to the amount of protein that can be added; however, the maximum permissable protein content varies with other components of the concentrate.

EXAMPLE 13

A concentrate (K) was formulated as follows and prepared in the manner of concentrate A.

| Ingredient | % in Formula | % Solids | % Protein |
|---|---|---|---|
| 35% WPC, 47% solids | 71.13 | 33.43 | 11.70 |
| Trace Mineral solution | 0.162 | 0.043 | |
| Magnesium sulfate heptahydrate | 0.112 | 0.0575 | |
| BASF water dispersible vitamins | 0.538 | 0.538 | |
| Tricalcium phosphate | 0.540 | 0.540 | |
| Propionic acid | 0.40 | 0.40 | |
| Dextrose corn syrup, 71% solids 21.474 | 20.575 | 14.601 | |
| Water | 0.90 | — | |
| Sodium chloride | 1.0 | 1.0 | |
| Choice white grease | 3.5 | 3.5 | |
| Fat soluble vitamins | 0.028 | 0.028 | |
| Lecithin | 0.10 | 0.10 | |
| Tenox 2 | 0.0055 | 0.0055 | |
| Product 198 | 0.015 | 0.007 | |
| 75% H$_3$PO$_4$ | 1.0 | 0.75 | |

| Ingredient | % in Formula | % Solids | % Protein |
|---|---|---|---|
| (to pH 5.0) [40% KOH (pH adjustment of WPC)] | 0.4 | | |
| | 100.00 | 55.00 | 11.70 |

Concentrates L, M, and N were similarly formed, but with substitution of different sugar solutions, each adjusted to 71% solids prior to addition. Concentrate L had sucrose, formula M had high fructose corn syrup and formula N had 62 DE/44 Be corn syrup. The viscosities of concentrated K, L, M, and N were 935, 849, 730 and 772, respectively.

The various features of the invention which are believed to be new are set forth in the following claims.

What is claimed is:

1. An improved, shelf-stable, flowable liquid milk replacer concentrate of non-heat denatured milk whey protein, sugar, and fat or oil, said concentrate for monogastric animals comprising about 10 to about 45 percent sugars, including about 10 percent to about 35 percent lactose or its monosaccharide hydrolysis products plus up to about 35 percent additional monosaccharides or disaccharides or mixture thereof; about 10 percent to about 16 percent proteins, of which at least about 60 percent are non-heat denatured milk serum proteins; about 1 percent to about 25 percent fat or oil; an emulsifier in an amount sufficient to emulsify the fat or oil in the concentrate, said fat or oil being emulsified in said concentrate; said milk replacer concentrate having a total solids content of from about 50 percent to about 75 percent, a viscosity of between about 100 and about 5000 centipoises, a pH between about 4.0 and about 7.0 and a water acitvity of between about 0.7 and about 0.87, said concentrate providing a complete nutrient source for monogastric animals, whereby it may be fed to animals subsequent to dilution with water to an appropriate consistency.

2. A milk replacer concentrate in accordance with claim 1 further including minerals and vitamins.

3. A milk replacer concentrate in accordance with claim 1 further including a medicant.

4. A milk replacer concentrate in accordance with claim 1 wherein said fat or oil is a liquid vegetable oil.

5. A milk replacer concentrate in accordance with claim 1 wherein said lactose is hydrolyzed to glucose and galactose.

6. A milk replacer concentrate in accordance with claim 1 wherein said additional monosaccharides are fructose.

7. A milk replacer in accordance with claim 1 wherein said sugar and said fats or oils are provided in amounts sufficient to provide between about 500 and about 5,000 calories per liter of said concentrate when diluted to 11 percent solids.

8. A milk replacer concentrate in accordance with claim 1 further including antimycotic agent(s).

9. A method for preparing an improved flowable liquid milk replacer concentrate of non-heat denatured milk whey protein, sugar and fat or oil for monogastric animals, the method comprising mixing a non-heat denatured milk protein concentrate, sugar and fat or oil with water in amounts sufficient to provide total solids of between about 50 to about 75 percent, about 10 to about 45 percent sugars, including about 10 to about 35 percent lactose or its monosaccharide hydrolysis products plus up to about 35 percent additional monosaccharides or disaccharides or mixture thereof, about 10 to about 16 percent protein, about 1 to about 25 percent fat or oil, and emulsifier in an amount sufficient to emulsify said fat or oil; mixing said ingredients to provide a uniform mixture and emulsifying the said ingredients to provide a liquid concentrate having a viscosity of between 100 and 5000 centipoises, a pH between about 4.0 and about 7.0, and a water activity of between about 0.7 and about 0.87, said concentrate being prepared at temperatures below about 175° Fahrenheit (79.4° C.) so as not to heat denature said protein, thereby providing a complete nutrient composition for said monogastric animals in liquid form which is fed to said monogastric animals subsequent to dilution with water to an appropriate consistency.

10. A method in accordance with claim 9 wherein said lactose is at least partially hydrolyzed 11. A method in accordance with claim 9 including at least partially hydrolyzing said non-heat denatured protein with proteolytic enzymes.

12. A method in accordance with claim 9 wherein both said protein and said lactose are hydrolyzed by suitable enzymes.

13. A method in accordance with claim 9 including adjusting the amounts of said sugars and of said fats and oils so that said sugars and said fats or oils provide between about 100 and about 1000 calories per liter when said concentrate is diluted to 11 percent solids.

* * * * *